United States Patent [19]

Orlandi

[11] Patent Number: 5,303,736

[45] Date of Patent: Apr. 19, 1994

[54] MIXER VALVE FOR HOT AND COLD WATER WITH SILENCER

[75] Inventor: Alessio Orlandi, Castiglione D/Stiviere, Italy

[73] Assignee: Galatron S.r.l., Castiglione D/Stiviere, Italy

[21] Appl. No.: 855,435

[22] Filed: Mar. 23, 1992

[30] Foreign Application Priority Data

Mar. 25, 1991 [IT] Italy .................. BS91 A 000032

[51] Int. Cl.$^5$ .................. F16K 11/06; F16K 47/02
[52] U.S. Cl. .................. 137/625.4; 137/625.17; 251/127
[58] Field of Search .................. 137/625 A, 625.17; 251/127

[56] References Cited

U.S. PATENT DOCUMENTS

| | | | |
|---|---|---|---|
| 4,157,099 | 6/1979 | Delker et al. | 137/625.4 X |
| 4,327,771 | 5/1982 | Nikolayczik | 137/625.4 |
| 4,362,186 | 12/1982 | Parkison et al. | 137/625.17 |
| 4,621,659 | 11/1986 | Pawelzik | 137/625.4 X |
| 4,765,368 | 8/1988 | Mutti et al. | 137/625,17 X |

*Primary Examiner*—Arnold Rosenthal
*Attorney, Agent, or Firm*—McGlew & Tuttle

[57] ABSTRACT

The invention relates to a mixer valve for hot and cold water having a cartridge-type body enclosing two overlapping plates one of which is fixed and the other movable on the fixed one through a control rod and in which the fixed plate has a mixing chamber (20, 20') with an antinoise structure (22) which only covers the internal lateral surfaces of the chamber itself, said antinoise structure (22) being made from a net element (23) or from protuberances or rough parts formed in the chamber itself.

2 Claims, 5 Drawing Sheets

MIXER VALVE FOR HOT AND COLD WATER WITH SILENCER

FIELD OF THE INVENTION

The present invention relates to mixer valves for hot and cold water in sanitary units.

BACKGROUND OF THE INVENTION

Various mixer valves for hot and cold water incorporate a mixer unit including two overlapping disks or plates in a ceramic material or the like, one disk or plate being fixed and the other movable on the fixed one. The fixed disk has two water inlet holes which are joined to two separate pipes for hot and cold water and an outlet hole which coincides with the mouth of the water delivery tap. The movable disk has a mixing chamber designed to selectively join one, the other or both the water inlet holes with the outlet one.

However, it has been found that the passing of the water from the inlet holes of the fixed disk to the mixing chamber of the movable disk and then to the outlet and delivery hole results in the structure being noisy as well as leading to cavitations and load loses which negatively influence the effective capacity of the valve. So, in order to ensure a standard capacity it is not possible to reduce the span of the passages further than a certain limit which also prevents the reduction in the size of the disks or plates and therefore of the valve as would be expected. On the other hand, the reduction of the span could be the cause of a noise increase. Thus it is necessary to continue the research in order to find a compromise in said mixer valve which permits the noisyness to be maintained and ensures a capacity within the forseen standard limits, and which allows for a reduction in the size of the overlapping disks or plates and consequently of the valves.

Attempts which have so far been made have obtained worthy results, which can still be improved upon, as far as noise reduction is concerned but often resulting in a loss of capacity.

A method for solving the problem has been proposed in patent IT-A-1207763, by the same applicant, relative to a mixer valve incorporating a movable plate, the mixing chamber of which has an antinoise element, made from a metallic net, with two parts which are perpendicular to each other and form two permeable barriers designed to be traversed by the flow of water from the inlet holes to the outlet hole through the mixing chamber.

Even though said barriers are permeable and suitable for the reduction in noise of the flow, they tend to limit the capacity and therefore do not obtain the forseen results.

SUMMARY AND OBJECTS OF THE INVENTION

The present invention aims to solve the problem in a new and original way by reducing the noise level and eliminating the parts and phenomenons which negatively influence the capacity.

It is infact the object of the present invention to supply a mixer valve of the above mentioned type where the antinoise structure is only forseen on the lateral surfaces of the mixing chamber of the movable plate and is applicable to any mixer valve and to any type of mixing chamber.

The antinoise structure can be in the shape of a net or the like which is fitted to the surfaces of the mixing chamber or alternatively can be crevices or rough parts formed directly with the fixed plate on at least one part of the surfaces of said chamber.

The here proposed solution permits the elimination of each barrier which can intercept the flow of water, therefore leaving the mixing chamber free for the passing of water.

Experiments which have been carried out have confirmed how the antinoise structure effectively ensures that the noise is kept below the standard levels and how the capacity is then optimized, creating presuppositions for a reduction in the span and therefore of the size of the seal plates always guaranteeing the requested and necessary capacity as well as a gentle maneouvering.

According to the Invention, a mixer valve for hot and cold water is provided including a cartridge type body which encloses two overlapping plates. One of the overlapping plates is fixed and the other plate is movable on the fixed plate by means of a control rod. The fixed plate has two holes for the separate inlet of hot and cold water and a hole for the outlet of hot, cold or mixed water. The moveable plate provides a mixing chamber with lateral surfaces and an opening for joining the mixing chamber to the hot water inlet, the cold water inlet or both water inlet holes. The chambers open toward the fixed plate enclosed on the opposite side. The invention provides an anti-noise structure provided in the mixing chamber of the moveable plate. The anti-noise structure only covers the internal surfaces (lateral surfaces) of the chamber itself and is specifically provided not to intercept the flow of water thus leaving the chamber completely free for the passage of water.

Another trick which contributes to the reduction of cavitations and load loses in the valve and to optimize the capacity, consists of a new configuration of the passages for the inlet of water to the valve obtained through a shaping of the passages themselves without resorting to patching elements.

BRIEF DESCRIPTION OF THE DRAWINGS

Further details of the invention will appear clearer following the description with references being made to the attached drawings in which.

DETAILED DESCRIPTION OF THE PREFERRED EMBODIMENTS

Figure 1:
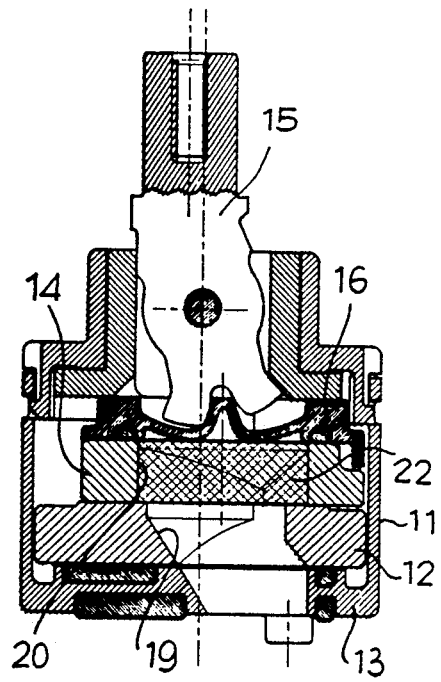
FIG. 1 is a longitudinal section view of a first example of a mixer valve in a closed position.

The mixer valves usually have a cartridge-type body (11) which encloses a lower fixed plate (12) sealed to the bottom (13) of the body (11) and a movable plate (14) resting against and movable on the fixed one.

The movable plate (14) is operated by a control rod (15) which is indirectly connected to the plate itself through an interposed plate cover (16).

Two holes or slits (17, 18) are formed in the fixed plate (12), said holes or slits joining to two corresponding pipes (not shown) for the separate supplying of hot and cold water and a hole (19) is formed for the outlet of hot, cold or mixed water towards a delivery mouth. The movable plate (14) has a mixing chamber (20) which is open towards the fixed plate (12) and closed at the top by the plate cover (16). Depending on the position of the movable plate in respect to the fixed one, the plate cover completely closes or either partially or totally joins the water inlet holes (17, 18) to the outlet one (19).

Figure 2:
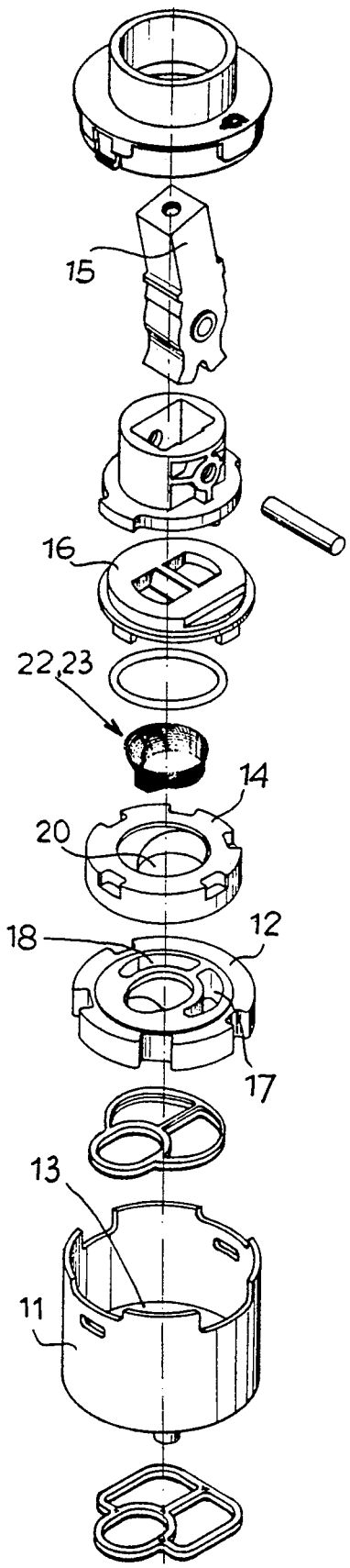
FIG. 2 is an exploded view of the components of the valve in FIG. 1.
Figure 3:
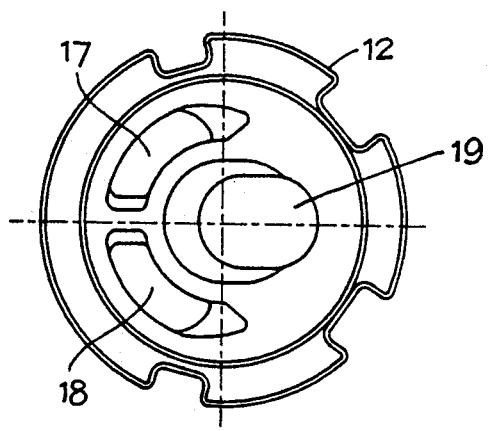
FIGS. 3 and 4 are plan views respectively of the fixed plate and movable plate which are incorporated in the valve.
Figure 4:
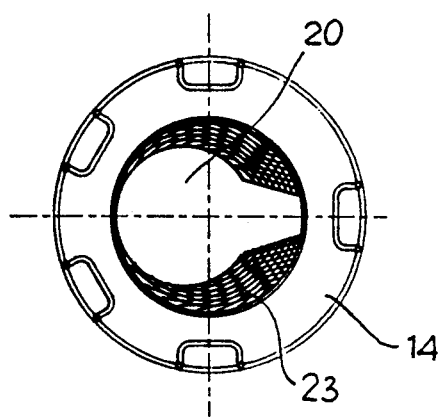
Figure 6:
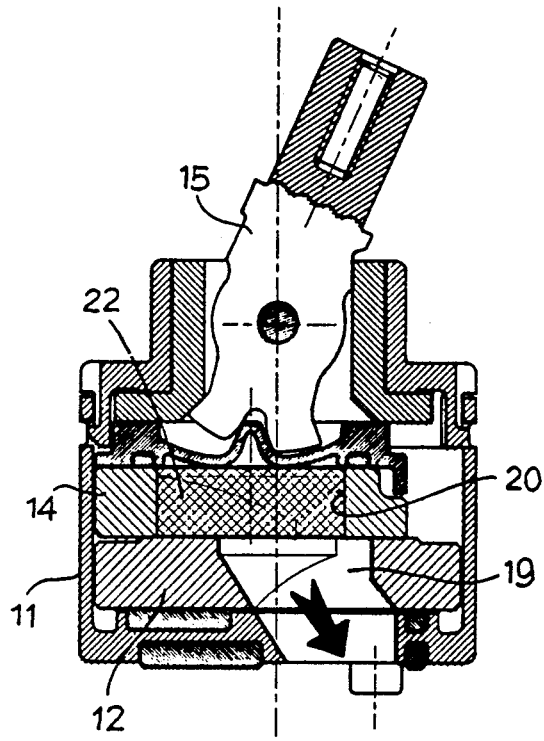
FIG. 6 is a section view of the valve in FIG. 1, but in a completely open position for the delivery of mixed water.
Figure 8:
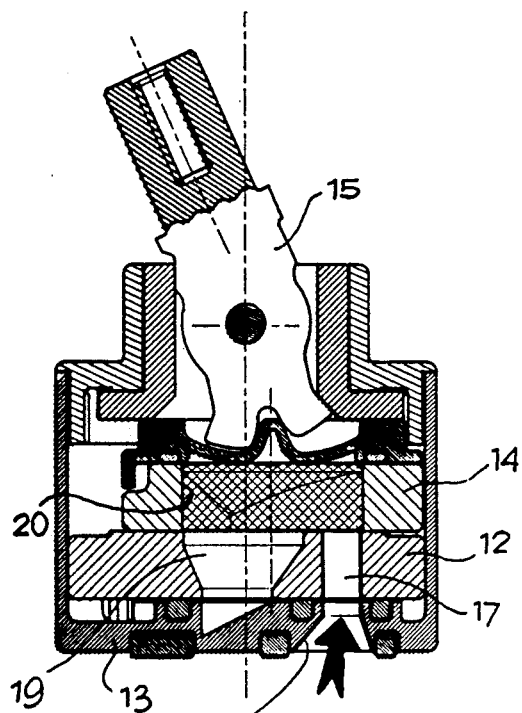
FIG. 8 is a section view of the valve in FIG. 1, but in an open position for the inlet and delivery of only hot water.
Figure 9:
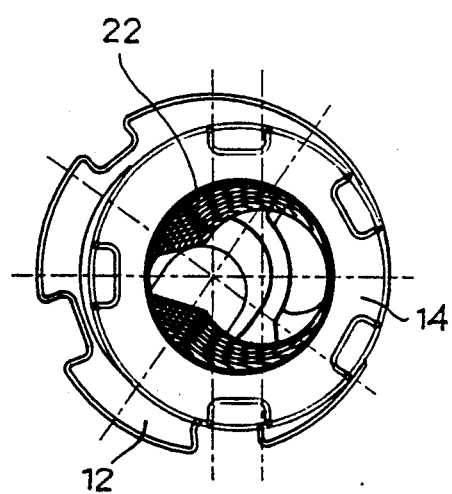
FIG. 9 shows the overlapping fixed and movable plates in an open valve position as in FIG. 8.

An example of a mixer valve is illustrated in FIG. 2 in an exploded drawing and in FIGS. 1, 6 and 8 as assembled in various conditions of use.

This mixer valve has no bottom distributor and incorporates fixed and movable plates (12, 14) with the above mentioned characteristics (FIGS. 3, 4, 5, 7, 9).

Figure 5:
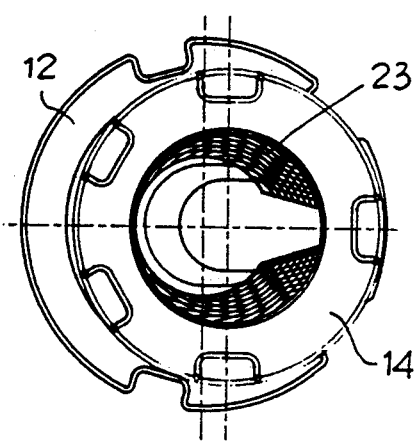
FIG. 5 shows the overlapping fixed and movable plates in a closed valve position.
Figure 7:
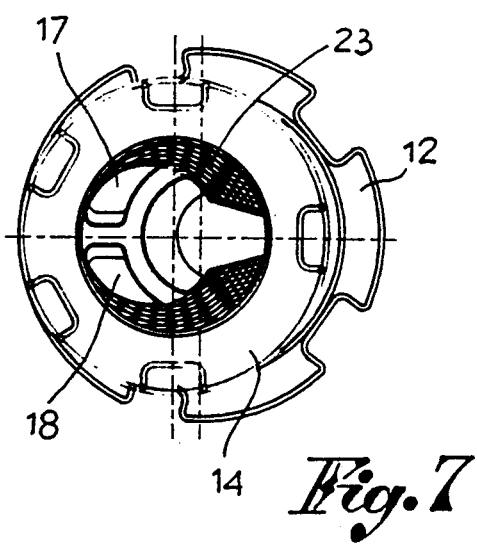
FIG. 7 shows the overlapping fixed and movable plates in an open valve position as in FIG. 6.
Figure 12:
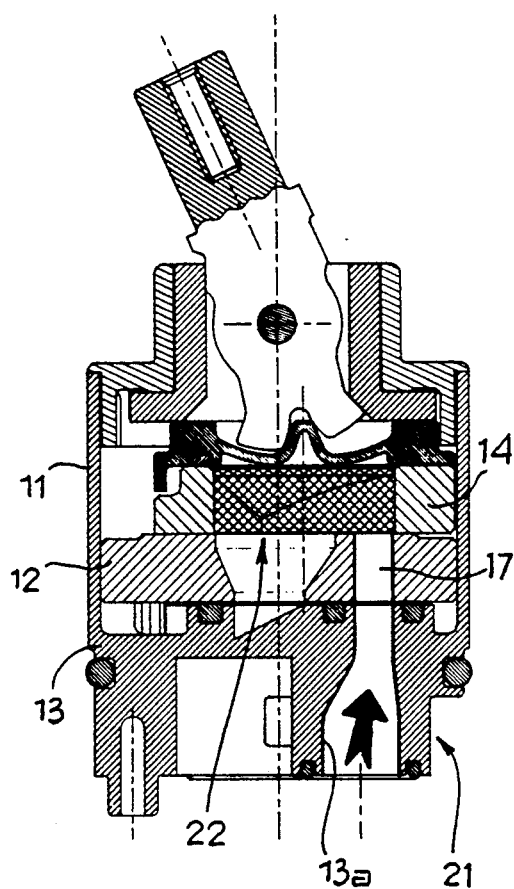
FIG. 12 is a longitudinal section view of an example of a mixer valve with a base distributor incorporating an antinoise structure in accordance with the invention and in a position for the delivery of only hot water.

Another example of the mixer valve is shown in FIG. 12 which is the same as the one in FIGS. 1, 5 and 8 and usually incorporates fixed and movable plates (12, 14) as described above but differs in the fact that it has a bottom distributor (21).

Figure 14:
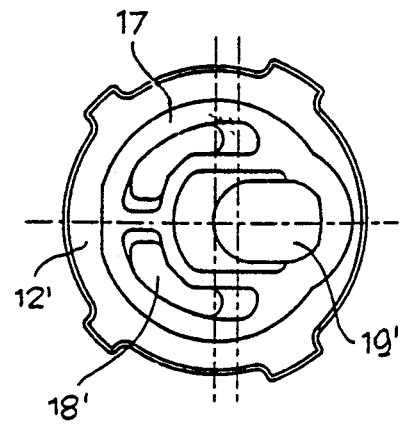
FIGS. 14 and 15 are plan views respectively of the fixed plate and the movable plate incorporated in the mixer valve in FIG. 13.
Figure 13:
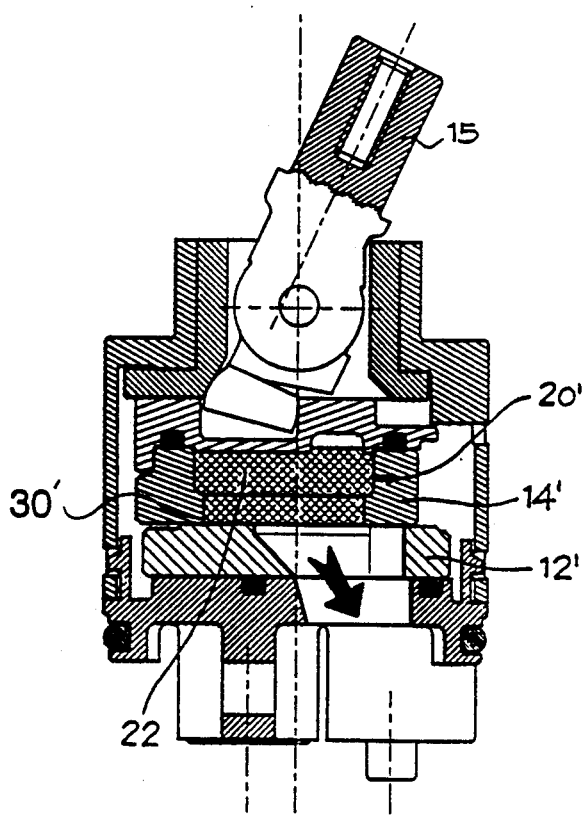
FIG. 13 is a longitudinal section view of another example of a mixer valve with a different configuration of the mixing chamber in an open position for the delivery of mixed water.
Figure 15:
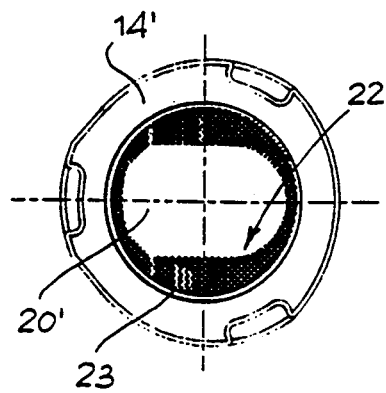
Figure 16:
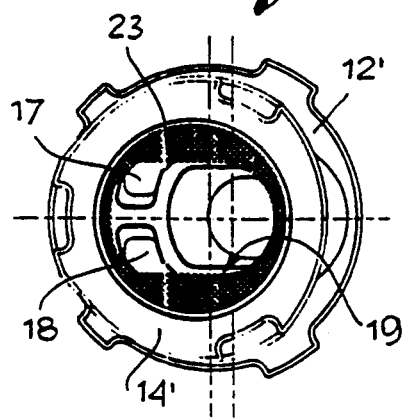
FIG. 16 shows the overlapping fixed and movable plates in an open valve position as in FIG. 13.

Yet another example of a mixer valve is illustrated in FIG. 13 which has a fixed plate (12') with inlet holes (16', 17') and an outlet hole (18') of a different shape and has a movable plate (14') with a mixing chamber (20') of a different configuration as can be seen in FIGS. 14–16.

Figure 10:
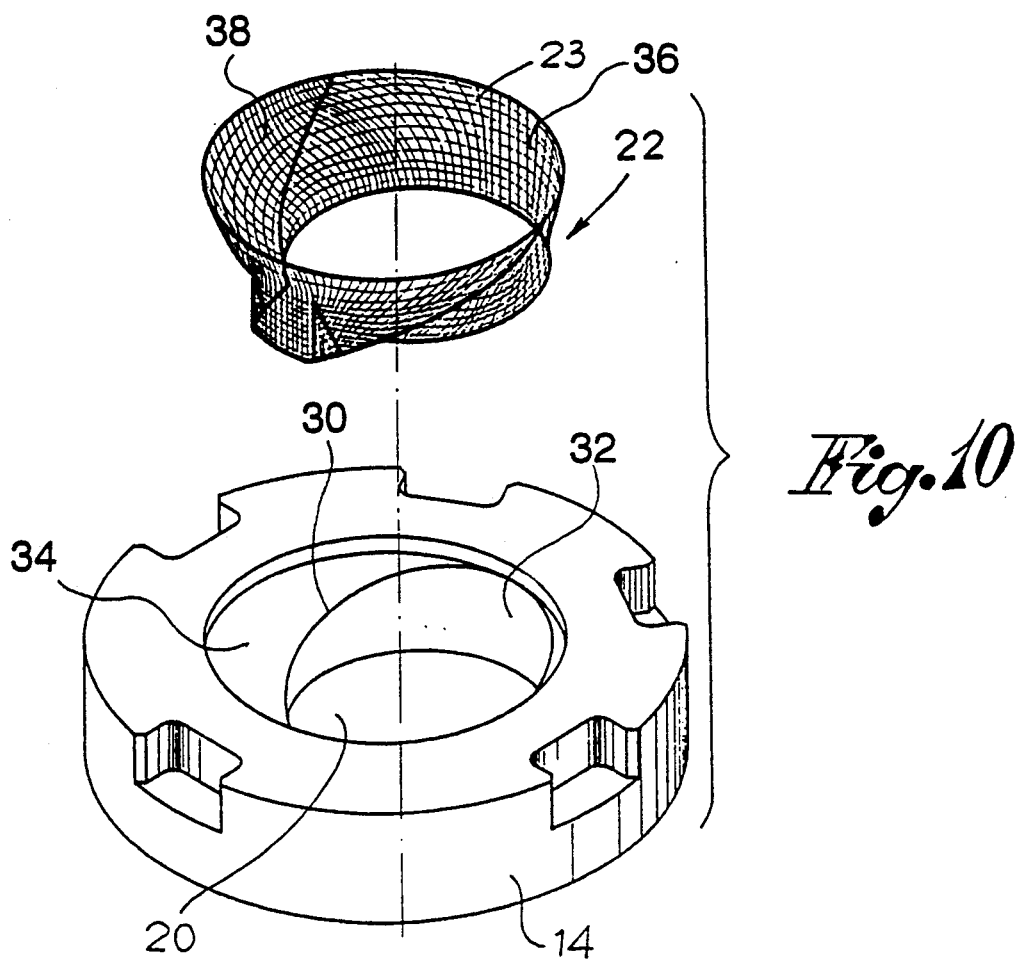
FIG. 10 is an enlarged prospective view of the movable plate separated from the antinoise element.
Figure 11:
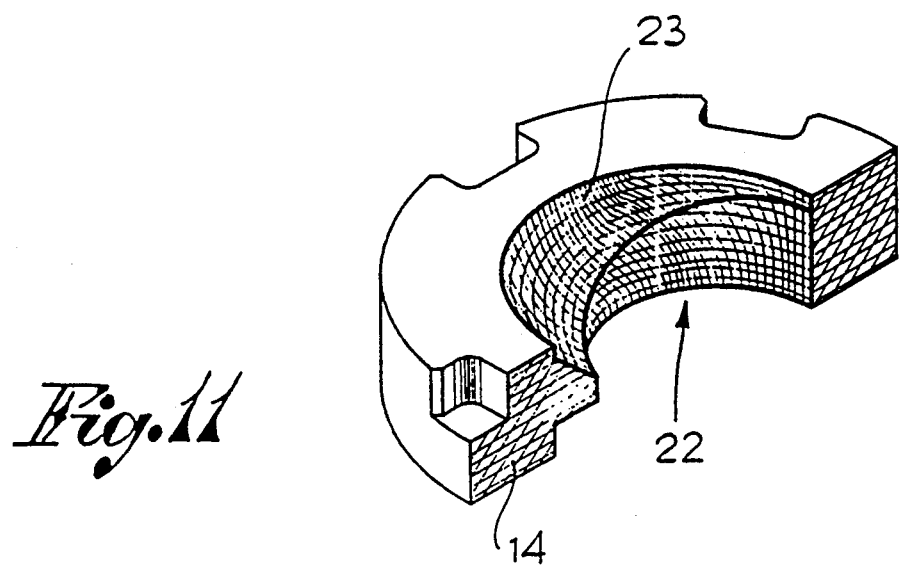
FIG. 11 is a section plane of the movable plate assembled with the antinoise element.

According to each of the two main embodiments (FIGS. 1 through 12 and FIGS. 13 through 16 respectively) the hole 19 of the mixing chamber 20 is smaller is cross section than the largest dimension of the mixing chamber itself. This provides a taper to assist in defining a seat for receiving the antinoise structure 22, preferably in the form of the net element 23. As seen in FIG. 10, the moveable plate 14 is provided with a ridge 30. This separates the internal surfaces into a substantial vertical surface 32 and an inclined surface 34. The net element 23 is contoured in a similar way including a portion 36 which is substantially vertical and a portion 38 corresponding to the inclined surface with ridge-type line between the two different contoured surfaces. In this way, the internal surfaces of the moveable plate 14 define a seat for receiving the net element 23. Similar structure is provided in the embodiment of FIG. 13 through 16 including a ridge 35 wherein the internal surfaces have an inclined surface and a substantially vertical surface (above and below the ridge). The net 23 is formed to be positioned within the seat defined by the internal surfaces including ridge 35.

In accordance with the invention the mixing chamber (20, 20') of the movable plate (14, 14') has an antinoise structure (22) which covers all of or part of the lateral surface of the chamber itself.

The antinoise structure (22) of a preferable embodiment has a net element (23), (FIGS. 10 and 11) which adapts itself like a shirt to the internal surface of the chamber (20, 20'). The net element (23) will therefore be of the shape and dimensions of the lateral surface, or at least of one part of said chamber. The application of an antinoise element in a mixing chamber of any form is thus easy and quick seeing that each type of cartridge available on the market can have a mixing chamber of a different shape: the antinoise element need only to be shaped on the basis of the lateral surfaces of the chamber.

The application of such an antinoise element (22) is shown in FIGS. 1, 5 and 8 as well as in FIGS. 4, 5, 7, 9 and 10 which illustrate the movable plate (14) by itself or when it is overlapped on the fixed plate (12), (FIGS. 13, 15 and 16) when the mixer valve has a mixing chamber (20') of a different configuration.

The anitnoise structure (22) is another embodiment can be made from protuberances or rough parts formed on at least parts of the lateral surface of the mixing chamber of the movable plate when the latter is being moulded.

In each case the antinoise structure (22) effects the flow of water which passes through the chamber reducing the noise level. At the same time, such a structure which only effects all of or part of the internal surface of the mixer valve does not obstruct the chamber itself in any way, nor does it intercept the flow of water thus leaving the chamber completely free for the passing of the water and optimizing the capacity of the valve.

As mentioned above, the capacity of the valve can be improved even by reducing the cavitations and load loses through a shaping of the inlet passages in the valve for both hot and cold water. Accordingly, the cartridge-type body has water inlet holes on the bottom (13), (FIGS. 8 and 12), with a flared mouthpiece (13a) which pipes and canalizes the water with reduced vorticity and cavitations towards the corresponding holes or slits (16, 17) of the fixed plate which are in turn flared towards the movable plate for an improved flow of water to the mixing chamber.

I claim:

1. A mixer valve for hot and cold water, comprising: a cartridge type body; a fixed plate in said cartridge type body, said fixed plate having a hot water inlet, a cold water inlet and an outlet hole for the outlet of hot, cold or mixed water; a movable plate having an opening toward said fixed plate and being closed on an opposite side and having internal surfaces including a ridge separating a substantially vertical surface from an inclined surface portion, said inclined surface portion cooperating with said ridge to define a seat and said internal surfaces cooperating with said closed opposite side to define a mixing chamber, said movable plate being connected to a control rod for movement relative to said fixed plate; and anti-noise means including structure with a single layer net element completely overlying only said internal surfaces of said movable plate, said net element being shaped corresponding to said substantially vertical surface, said inclined surface portion and said ridge to maintain said net element on said seat with an outer side of said net element in contact with said internal surfaces, said internal surfaces defining an opening, coinciding with said opening of said movable plate for leaving said chamber opening free for passage of water therethrough.

2. A mixer valve according to claim 1, wherein said opening of said moveable plate has a cross sectional area which is less than a cross sectional area of said mixing chamber.

* * * * *